United States Patent
Flores et al.

(10) Patent No.: US 7,932,824 B2
(45) Date of Patent: *Apr. 26, 2011

(54) ITEM TRACKING SYSTEM

(75) Inventors: Eduardo Ruiz Esparza Flores, San Pedro Garza Garcia (MX); Jose Adalberto Terán Matus, San Pedro Garza Garcia (MX); Rafael Guillemo Ramos Elizondo, Monterrey (MX); Patricio Gerardo Trevino Ramirez, San Pedro Garza Garcia (MX)

(73) Assignee: RFID Mexico, S.A. DE C.V., San Pedro Garza Garcia (MX)

( * ) Notice: Subject to any disclaimer, the term of this patent is extended or adjusted under 35 U.S.C. 154(b) by 361 days.

This patent is subject to a terminal disclaimer.

(21) Appl. No.: 11/856,869

(22) Filed: Sep. 18, 2007

(65) Prior Publication Data

US 2008/0088454 A1   Apr. 17, 2008

Related U.S. Application Data

(63) Continuation-in-part of application No. 11/580,006, filed on Oct. 13, 2006, now Pat. No. 7,557,709.

(51) Int. Cl.
*G08B 13/14* (2006.01)

(52) U.S. Cl. .......... 340/572.1; 340/568.1; 340/5.92; 340/825.49

(58) Field of Classification Search ............. 340/572.1, 340/568.1, 5.92, 505, 568.8, 569, 570, 825.49, 340/572.2–572.9, 10.42, 10.5, 10.1, 10.52
See application file for complete search history.

(56) References Cited

U.S. PATENT DOCUMENTS

| | | | | |
|---|---|---|---|---|
| 4,845,492 A * | 7/1989 | Cobb et al. | .............. | 340/825.49 |
| 6,737,961 B2 * | 5/2004 | Flick | .............. | 340/426.35 |
| 6,774,782 B2 * | 8/2004 | Runyon et al. | .............. | 340/505 |
| 6,989,749 B2 * | 1/2006 | Mohr | .............. | 340/572.1 |
| 7,049,961 B2 * | 5/2006 | Maloney | .............. | 340/568.1 |
| 7,489,242 B2 * | 2/2009 | Hines et al. | .............. | 340/572.1 |

* cited by examiner

*Primary Examiner* — Daniel Previl
(74) *Attorney, Agent, or Firm* — Young & Thompson

(57) ABSTRACT

An item tracking system which makes use RFID technology for automatically monitoring the taking and returning operations of items from one or more storage locations inside a working area which allows to have an "on line" status of each tool as well as the using history of each tool, furthermore, the system "knows" which item has been taken or stored from which storage area by which worker and when and synchronize and compile the information of all storage locations in one database and system for administering, reporting and sending alarms in order to have total tool control, accountability, tools service control (maintenance, calibration, repairs, and/or replacement), and administration of usage for the tools controlled by the system.

53 Claims, 5 Drawing Sheets

ITEM TRACKING SYSTEM

BACKGROUND OF THE INVENTION

A. Field of the Invention

The present invention is related to systems for tracking and controlling items inside a predetermined area and more particularly to an item tracking system for controlling the lending and returning of items assigned to predetermined storing locations inside a working area by the workers.

B. Description of the Related Art

In certain working places such as aeronautics workshops, it is critical to keep an extremely clean and safe environment, since any object, even small ones, can get lost and end inside an engine or turbine for example, which can be disastrous during testing or operation of the engine, damaging the engine and/or causing a serious problem in the aircraft during flight.

The above referred problem gets worse in a workshop where many tools and instruments are used by many people for maintenance operations and where said tools can eventually get lost and become a FOD (Foreign Object Damage or Foreign Object Debris).

Some times, when a tool gets lost, it is necessary to stop all the operations in the workshop until the tool is found, if it is even found, causing serious problems, costs and delays in the workshop and serious problems to the aircraft operator which lost precious time and money, not mentioning the risk of delivering an aircraft with a potential fatal problem.

In addition, it might happen that one worker could take by accident someone else's tool, alike to the one he has, and then leave that tool somewhere else; causing the people who are looking for the lost tool to waste a lot of time in the wrong place, which involves a great risk since the lost tool may cause a fatal accident if it is not found.

U.S. patent application No. 20070023193 discloses an inventory control system for monitoring the removal and replacement of tools including a container having a plurality of tool storage locations in the form of recesses. Each recess is individually-shaped to receive a specific tool, the shape of the recess being matched to the shape of the tool. A plurality of sensors are provided for sensing the presence of tools in the recesses, each sensor being located adjacent a recesses. A data processor receives signals from the sensing means and monitors the removal and replacement of tools, and an output device indicates the presence and/or absence of tools in the container. The sensors disclosed in the application may be magnetic sensors, optical sensors or magnetic switches which only detects when a tool has been replaced or removed from the storage locations, and since the system has not means to obtain information about the tool taken it can not check which tool has been taken or that the correct tool has been placed in each recess. In fact, since in the embodiment described in the patent application, the detectors are simple magnetic detectors, it would be easy to mislead the detection system, for example by placing a steel bolt in one of the recesses instead of the correct tool. Therefore, the main aim of the system is only to ensure that trusted personnel do not accidentally forget to return tools to the container after use.

U.S. Pat. No. 7,209,041 discloses mobile method and system for automatically monitoring the location and use of tools using radio-frequency identification ("RFID") tags. An RFID tag is secured to each tool with a unique numerical identifier. The RFID tag transmits its unique numerical identifier associated with each of the RFID tags using a RF signal, wherein the RF signal is transmitted at different intervals for each of the RFID tags. A receiver on a mobile platform reads the RF signals and determines the unique numerical identifier being transmitted. An information processor interconnected with the receiver analyzes the unique numerical identifier from a predetermined index, and the information processor determines whether any tools were not found on the index and automatically alerts a user when a tool is missing. The system makes use of self powered RFID active transmitters associated with each tool, and therefore, if the power source for one of the RFID active transmitter fails, the system will fail to control the respective tool. Furthermore, since the patent dose not disclose that the system includes means for identifying the users, it is not possible to relate a tool taking operation with the correspondent user, and therefore the taken and returning operations can not be fully controlled.

In view of the above referred problems, applicant developed a An item tracking system which makes use RFID technology for automatically monitoring the taking and returning operations of items from one or more storage locations inside a working area which allows to have an "on line" status of each tool as well as the using history of each tool, furthermore, the system "knows" which item has been taken or stored from which storage area by which worker and when, and synchronize and compile the information of all storage locations in one database and system for administering, reporting and sending alarms in order to have total tool control, accountability, tools service control (maintenance, calibration, repairs, and/or replacement), and administration of usage for the tools controlled by the system.

Applicant's system comprises: a plurality of user identification means using technologies such as and not limited to RFID and Bar Code; or fingerprint, each assigned to a respective user, each having personalized identification information recorded such as user name and/or user ID; a plurality of administrator, users and personnel of maintenance identification cards, each assigned to a respective user with respective privileges, each having personalized identification information recorded such as name and/or ID; a plurality of toolboxes, each having: a computer (processor, memory, user interfaces devices such as keyboard—optional—, touch screen—optional—, mouse—optional—, display—optional—, buzzers—optional—, speakers—optional—, communication interface such as cable network, wireless and/or portable memory), including a database, wherein the database of each toolbox's computer contains at least the following information: tools assigned to the respective toolbox and its position inside the toolbox; tools taken from the respective toolbox; tools returned to the respective toolbox and tool's status for presence or absence, services required, historic usages of the tools; automatic locking and unlocking means for each drawer controlled by the data processing and control system; a plurality of readable/writable RFID chips, each permanently joined to a respective tool; a plurality of RFID chip interrogators/scanners/sensors (called sensors) with capability to read and or save information into the RFID chip of each tool, each assigned to a respective storage location of a respective toolbox for specifically interrogating/scanning a respective RFID chip of one tool (this means a relation of one sensor per tool), each interrogator/scanner connected to the computer (directly or thought electronic circuits); wherein the computer of each toolbox is capable of controlling and registering the following functions: tool taking operations; tool returning operations; control of tools taken for several days (TDY: Temporary Duty); control of tools needing service; control of unserviceable tools; control of cases or containers containing inside or over multiple items usually small tools (this functionality of controlling containers with tools inside is called in this document "Critical Items"); and wherein the computer of each toolbox is capable of synchronizing information with the server system.

With applicant's system it is possible to have a tight control over each tool and an immediate control over taking and returning operations. Furthermore, applicant's system allows having a Real Time (RT) status of each tool, the using history of each tool, control of the tools needing service, record of the usage of each tool among other functionalities.

Since the system links each operation with a respective worker and record on every RFID chip place on every tool the worker id, date and time of taking the tool, it is almost impossible to lose any tool and returning a different tool, since the system would detect that said tool is related to other employee. A skilled in the art may suggest that the RFID tag may be easily retired from the tool and attached to other tool, but applicant's system requires that each RFID tag be attached to the tool by means of special substances already available in the market which practically "integrates" the RFID tag to the tool in such way that if someone tries to detach it from the tool, the possibilities that the RFID tag is damaged are very high, thus avoiding fraudulent practices.

SUMMARY OF THE INVENTION

It is therefore a main object of the present invention to provide an item tracking system which makes use of RFID technology for automatically monitoring the taking and returning operations of items from a storage location inside a working area.

It is another main object of the present invention to provide an item tracking system of the above referred nature which allows having a Real Time (RT) status of each tool, the using history of each tool, control of the tools needing service, record of the usage of each tool among other functionalities.

It is a further object of the present invention to provide an item tracking system of the above referred nature, which links each operation with a respective worker and record on every RFID chip place on every tool the worker id, date and time of taking the tool, links each operation with a respective worker, thus maintaining a register of which tools are being used by each worker.

It is an additional object of the present invention to provide an item tracking system of the above referred nature which avoids that a worker returns any tool not corresponding to the tool the system registered as originally taken by the worker or returning the tool to a different place from where it was taken.

It is an additional object of the present invention to provide an item tracking system of the above referred nature which allow a user to read the information recorded in the chip on every tool in a remote location using a reader connected to a conventional computer or portable terminal.

These and other objects and advantages of the physical inventory auditor system of the present invention will become apparent to those persons having an ordinary skill in the art, from the following detailed description of the embodiments of the invention which will be made with reference to the accompanying drawings.

DETAILED DESCRIPTION OF THE INVENTION

Figure 1:
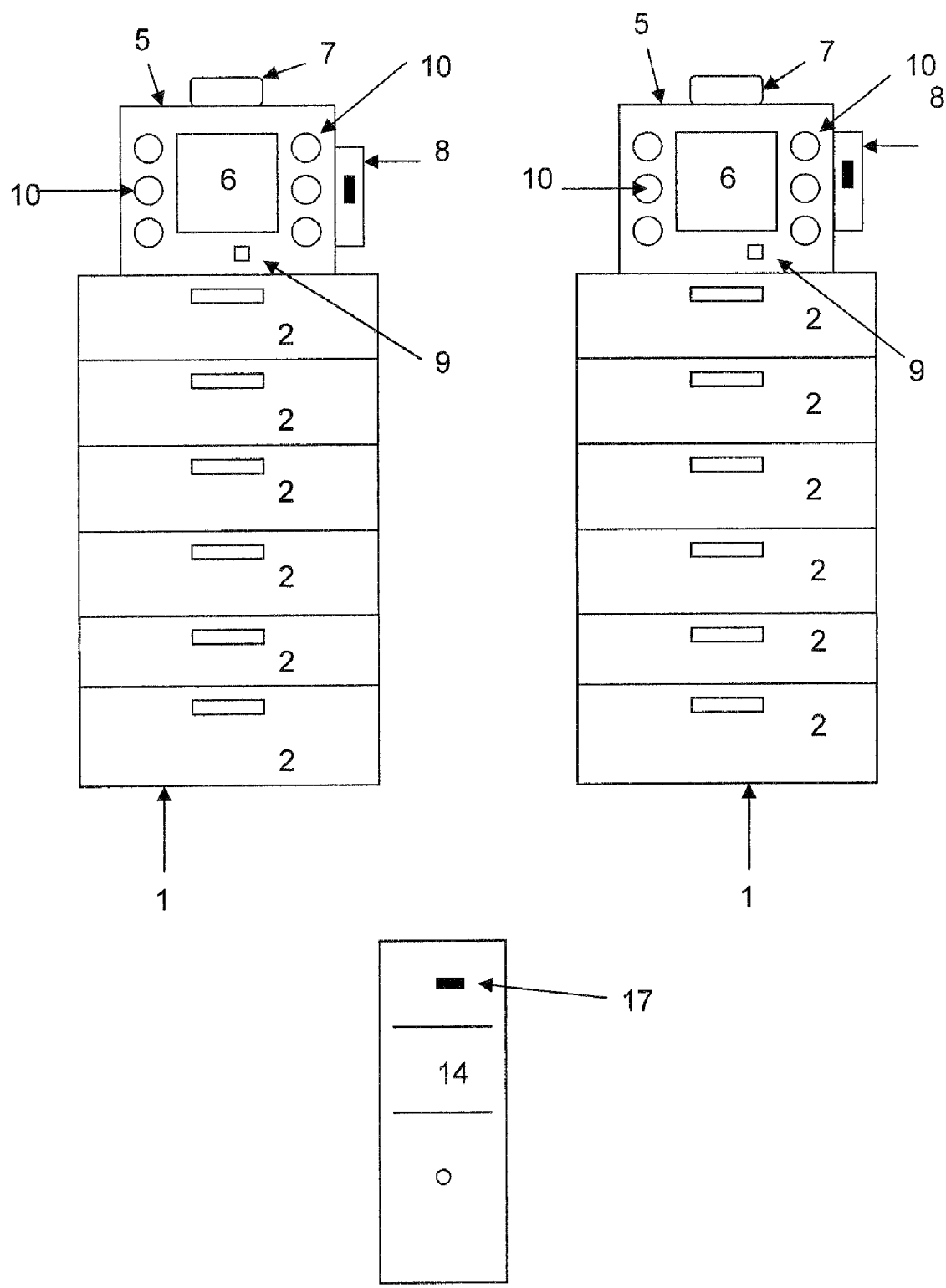
FIG. 1 shows a scheme of the item tracking system of the present invention.
Figure 2:
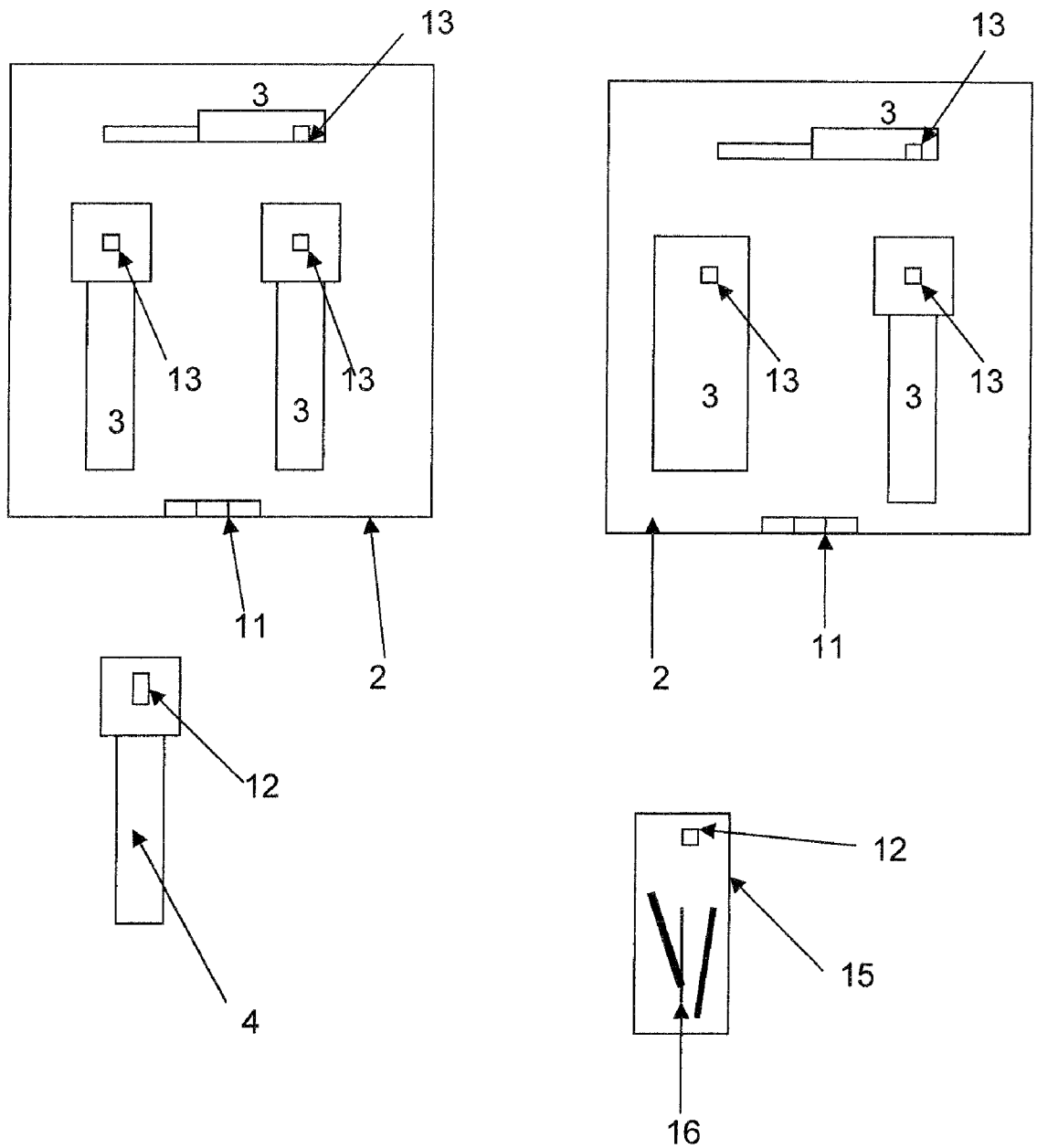
FIG. 2 shows a scheme of one of the drawers of a toolbox of the item tracking system of the present invention.

The item tracking system of the present invention will be described making reference to the accompanying drawings and to a preferred embodiment.

In a preferred embodiment, the item tracking system of the present invention is used in a workshop having a plurality of toolboxes 1 each having a plurality of drawers 2 each including a plurality of tool storage locations 3, each tool storage location 3 comprising an individually shaped recess for receiving a specific tool 4 which can be taken or returned, wherein the shape of the recess matches to the shape of the tool or container, wherein the item tracking system of the present invention comprising:

a plurality of user identification cards (not shown) using technologies such as and not limited to RFID, Bar Code and fingerprint, each assigned to a respective user and each having personalized identification information recorded such as user name and/or user ID and user profiles selected from the group comprising normal user, administrator and maintenance;

a plurality of toolboxes 1, each having:

a computer 5, including a database, a screen for displaying data 6 and a user identification card reader 7 for reading the user/administrator/maintenance person identification cards and further including a memory card reader/writer 8, an RFID chip reader 9, and a physical user interface 10 comprising a plurality of buttons for programming and controlling the computer 5, wherein the database of each toolbox's computer contains the following information:

users authorized to access each tool box, drawers accessible to each user in each tool box and privilege type which is selected from the group comprising: user of tools, administrator and maintenance person;

tools assigned to the respective toolbox represented by the following data: Tool description, Tool ID, toolbox ID, drawer ID, storage location ID (pocket);

tools taken from the respective toolbox, represented by the following data User name, privilege type, tool description, Tool ID, toolbox ID, drawer ID, storage location ID, date and time of the taking operation;

tools returned to a respective toolbox before any new taking operation is performed represented by the following data: User name, privilege type, tool description, Tool ID, toolbox ID, drawer ID, storage location ID, date and time of the returning operation;

tool's status (including alarm status which will be explained later): user who changed status, privilege type, Tool description, Tool ID, toolbox ID, drawer ID, storage location ID, status, date and time of the change of status operation.

automatic locking and unlocking means 11 for each drawer controlled by the computer each including a sensor (not shown) for detecting when the drawer is opened or closed;

a plurality of readable/writable RFID chips 12, each permanently joined to a respective tool by means of an adherent substance, so that if someone tries to detach the RFID chip, it may be damaged, each having the following memory types:

memory type #1: the information contained in this type of memory is permanently recorded in the chip: tool ID, tool description and serial number;

memory type #2: the information contained in this type of memory can only be modified by an authorized person which is assigned by an administrator, by entering a password in either the toolbox's computer or from a computer with a sensor accessing the functionality to change it: ID of the company that owns the tool, company branch ID, toolbox ID (CTK number), and optionally: toolbox drawer ID and storage location ID (pocket) to which the tool and toolbox are assigned, memory type #3 the information contained in this type of memory is recorded in the chips of every tool stored in the drawers of a respective toolbox to which an user has rights to access, every time said user logs in to the system (which will be explained later) said information comprising the user ID and current time and date;

and further including a tool log which may be limited to a certain amount of records, including information about the user ID of the last users of the tool and the time and date in which the tool was taken and returned. The number of records can be configured by an administrator;

a plurality of RFID chip interrogators/scanners 13, each assigned to a respective storage location 3 (pocket) of a respective drawer 2 of a respective toolbox 1 for specifically interrogating/scanning a respective RFID chip 12 of one tool 4, each interrogator/scanner 13 connected to the computer 5;

a plurality of RFID chip recorders (not shown) each assigned to a respective storage location 3 of a respective drawer 2 of a respective toolbox 1 for specifically recording a respective RFID chip 12 of one tool 4 with the information described above for memory type 1, 2, and 3 including: user ID, time and date of the taken operation, and for updating the tool log, each RFID chip recorder connected to the computer 5;

a server system 14 connected to a computer network having a database containing information related to:

tools assigned to each toolbox represented by the following data: Tool description, Tool ID, toolbox ID, and optionally drawer ID, and storage location ID;

tools taken from each toolbox, represented by the following data User name, tool description, Tool ID, toolbox ID, drawer ID, storage location ID, date and time of the taken operation;

tools returned to each toolbox before any new taking operation is performed: User name, tool description, Tool ID, toolbox ID, drawer ID, storage location ID, date and time of the taken operation;

tool's status (including alarm status which will be explained later): user who changed status, Tool description, Tool ID, toolbox ID, drawer ID, storage location ID, status, date and time of the change of status operation.

User Profiles.

As previously explained there are three predetermined user profiles each having the following privileges:

The "normal user" profile allows a person to take and return tools from one or more toolboxes 1 and to enter reports in the system as will be explained later;

The administrator profile allows a person to: take and return tools, from one or more toolboxes, configure privileges for other users, configure user access capabilities which indicates the system which drawers of a toolbox a user is authorized to access, to authorize certain user operations such as to change the status of a tool to TDY status (which will be explained later) and to modify the information of the databases of server system 14 and of the toolboxes computers 5; and The maintenance profile allows a person to take and return tools having a status "needing calibration" or "unserviceable" which will be explained later and to enter into the system reports related to the type of work performed to the tools like repair, maintenance or calibration, replaced.

However the privileges for the above referred profiles can be modified by an administrator, and new custom profiles can be created for a single user or a group of users as will be explained later.

Standby Mode

The standby time comprises the periods during which no one is logged into the computer's toolbox 5. During standby time all drawers 2 remain closed and locked, and each RFID chip interrogator/scanner 13 located on every storage location 3 of each drawer 2 corresponding to every tool 4 is inactive.

However, the computer's RFID chip reader 9, which is located outside the drawers 2 of the toolbox 1, may be used by any person who wants to obtain the information of any tool controlled by the system without having to login, by just pressing a button in the computer's physical user interface 10 in order to activate the RFID chip reader 9, and read the information stored in a tool's chip 12. The reader information is presented in the screen 6, said information comprising the information described for memory type 1, 2, and 3 including: Company Id, branch ID, tool description, the ID of the user who last used the tool as well as the date and time when it was last used, toolbox ID drawer ID, and storage location ID where the tool belongs. Depending on the needs of an administrator, the information stored in the toolbox's computer 5 database could be presented in the display 6 in addition to the information read from the tool's chip 4.

It should be noted that additionally, the information recorded in the chips 4 on every tool 5 or case can be read using an external computer, laptop, mobile device, PDA, with a sensor connected.

Taking Operations

The toolbox computer display 6 normally presents a welcome screen showing a color shade selected from the group comprising blue, green, black, white or any other choice of color configurable by the administrator indicating that no tools 4 are missing from the toolbox 1, this means that all tools belonging to this toolboxes are in their proper pockets 3 not considering the ones out for service (like maintenance, calibration or repair) or the ones taken out as TDY, as will be explained later. When the welcome screen shows a red shade, it indicates that the toolbox is missing at least one tool not considering the ones out for service (like maintenance, calibration or repair) or the ones taken out as TDY.

When a user needs to take a tool from one of the toolboxes 1 (to initiate a taking operation), the user has to identify himself by passing the user identification card near the user identification card reader 7 of a respective toolbox (logging in). Then the user identification card reader reads the user ID from the user identification card, and the toolbox's computer 5 searches said user ID in its database which contains the user ID's authorized to access said specific toolbox. If the user ID is not found in said database, then the user is informed that he/she is no authorized to access said specific toolbox by displaying a message box in the display 6 showing the message "User Not Authorized".

If the computer 5 finds the user ID in its database of authorized users, it then searches the user profile and privileges for said user profile which define the actions he/she is allowed to perform and the user access capabilities, which define the drawer ID to which the user is authorized to access. Once the user has logged in and the privilege type and user access capabilities defined for the user, the information for memory type #3 (current user logged into the system as well as current date and time) is recorded in the chips 12 of every tool 4 stored in the drawers 2 of a respective toolbox 1 to which the user has the right to access and subsequently the computer 5 sends a signal to the correspondent locking and unlocking means 11 of the specific drawers 2 for unlocking the drawers 2 that the user is authorized to access. Also the computer 5 searches in its database for any tools related to the user ID that need to be returned to the toolbox 1 if any.

Once the recording of the chips 12 ends, each one of the RFID chip interrogators/scanners 13 of each storage location 3 located in each unlocked drawer 2 begin to interrogate the correspondent tool RFID 12 more than one time per second which in the preferred embodiment could be ten times per second, and the Tool ID of each tool 4 is sent to the computer for comparing the list of the Tool ID's detected with a database list of the tool ID's currently assigned to the respective drawers 2 for detecting when a tool is retired from the storage location 3. It should be noted that the RFID chip interrogators/scanners 13 can interrogate the RFID chips 12 more than ten times per second.

Then, the display presents a screen displaying the day, date, name of the user and a list of the tools that the user has already taken and that need to be returned. In case that the user has not taken any tool from the specific toolbox, then the list will be empty.

When the user opens a drawer 2, the correspondent sensor for detecting when the drawer is opened or closed, detects the action and sends a signal to the computer 5, which records this information into a log file When the user retires a tool 4 from a storage location 3, the correspondent RFID interrogator/scanner/sensor 13 fails to receive the information of said tool 4 and when the toolbox's computer 5 compares the list of the tool ID's detected by the interrogators/scanners 13 with the database list of the tools ID's currently assigned to the respective drawers 2, the comparison operation of the tool ID that the user has just taken will fail and the computer 5 will then acknowledge the taken operation of the specific tool. It must be noted that the above process takes only a fraction of a second, thus the taken operation is registered in real time by the computer. Once the computer acknowledges the taken operation, the operation is recorded in the database by recording the name of the user, user ID, tool ID and the hour and date in which the tool 4 has taken and presents in the display 6 the information of the action including and not limited to the tool description, drawer 2 where is was taken from, pocket 3 where it was taken from, current date/time. In case the tool need service, this information is displayed in a different color and will not allow the user to logoff without returning such tool to its original pocket 3 as will be explained later.

The above referred process is repeated each time the user takes a tool 4 from a storage location 3, and each time the user takes a tool 4, the operation is displayed in the screen 6, by means of a list indicating the tool ID and description and the current hour and date.

In case the user needs a tool 4 that is not stored in the toolbox 1 in such moment, he/she will have the option to press a button in the computer's interface 10 to register his/her need, so that the administrators of the system can take appropriate actions such as buying more of such specific tools.

If the user takes a tool in error, she/he only has to place it back again to the pocket 3 where it was originally placed and it will disappear from the list at the display 6, which basically comprises a returning operation as will be explained later.

When the user wants to end the taking operation, he/she can review the list of tools presented in the display to make sure it matches with the ones he/she has taken out. In case she/he finds a discrepancy, it is necessary to verify that the tool indicated as taken is placed properly into the right pocket 3. If it is found that there is still an error, she/he will have to call a person having an administrator privilege type in order to notify the discrepancy. Otherwise, if there are errors he/she must close all the drawers 2 and push a button in the computer interface 10 thus indicating that he/she wants to end the taking operation (log out). When the computer 5 receives said instructions, it checks first for any open drawer 2 by means of the sensors of the locking and unlocking means 11 and shows an alert in the display 6 if some of the drawers 2 are open. When the computer detects that all the drawers 2 are closed, it locks all the drawers 2, the screen 6 changes to the welcome screen and the color shade is set to red indicating that at least one tool 4 is missing from the toolbox 1.

It should be noted that as soon as the taken operation ends, the computer 5 will send this information automatically to the Server System 14 if it exist real time connection like and not limited to Wi-Fi or Network cable for synchronizing the information among the information of other toolboxes 1 for real time alarms and reports as will be explained later.

If a user wants to take the tools for more than one day (or shift), he/she has to start the taking operation with no tools owed. This means that if the user has tools pending for return at the moment of login and or she/he takes more tools out and/or return some others without cleaning all tools that he/she was owing since the beginning, the system will show a message staying that the user must return all tools owed and clean completely the whole list before taking the ones he/she wants to take for more than one day.

Once this condition is fulfilled, the user would be able to take the tools needed for more than one day and then push a "TDY" (Temporary Duty) button in the manual interface 10, which will request the computer 5 to change the status of the tool or tools to TDY, which means that said tool or tools will be taken for more than one day. Then the system will request a person having an administrator privilege to pass his/her ID card into the reader 7 for allowing the computer 5 to change the status of the tool or tools to TDY status and an icon will appear for such tools indicating the TDY status.

In case a user having tools in TDY status, login to take out more tools, he/she will not be requested to return all tools before taking those out as she/he has already tools having a TDY status, but the administrator id card will be still requested to increase the number of tools with TDY status, otherwise the system will not allow to logoff until either not authorized tools for TDY are returned or the administrator authorizes the TDY status for the additional tools. Messages indicating these reasons are always displayed. A user will be allowed to return only some tools on TDY status but an alarm will be set.

As previously explained, a person having an administrator privilege type is allowed to authorize certain users to change the status of a tool to TDY without needing administrator authorization.

Figure 3:
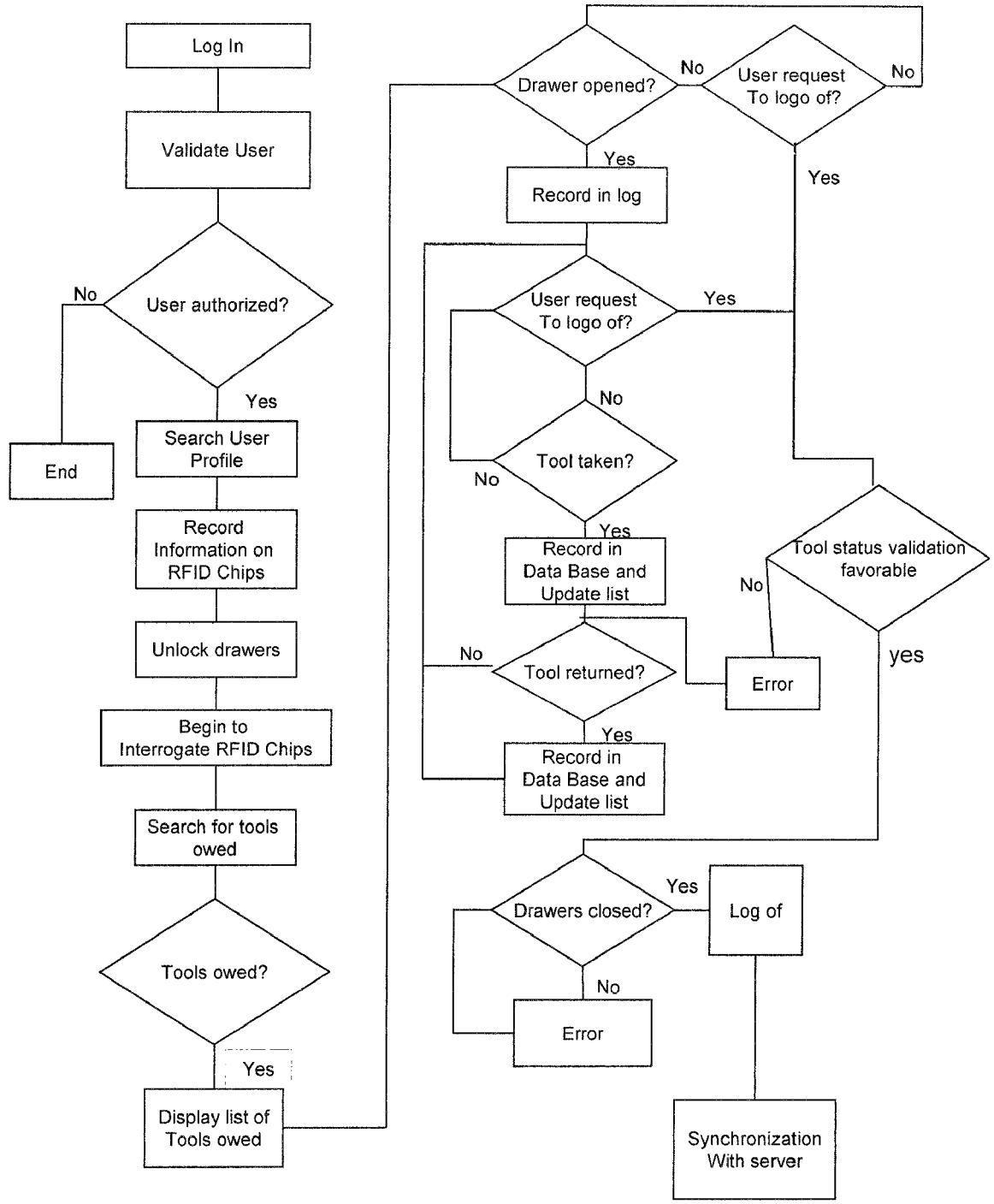
FIG. 3 comprises a flow chart of a preferred modality of a taking operation in accordance with the present invention.

The flow chart of FIG. 3 shows the above described taking operation. It has to be understood that the order of the steps of the taking operation described above and represented by the flow chart of FIG. 3, may be changed without altering the functionality of the Item tracking system of the present invention.

Returning Operations.

As previously described, when at least one tool 4 is missing from the toolbox 1, the welcome screen will show a red shade.

When a user needs to return a tool 4 to one of the toolboxes 1 (to initiate a returning operation), the user has to login by passing the user identification card near the user identification card reader 7 of a respective toolbox 1. Then the user identification card reader 7 reads the user ID from the user identification card and the toolbox's computer 5 searches said user ID in its database which contains the user ID's authorized to access said specific toolbox 1. If, for some reason, the user ID is not found in said database, then the user is informed that he/she is no authorized to access said specific toolbox 1 by displaying a message box in the display 6 showing the message "User Not Authorized". In such case, since the worker has already taken a tool 4 from the toolbox 1, the problem must be informed to a person having an administrator privilege type.

If the computer 5 finds the user ID in its authorized user database, then it searches the user profile and privileges for said user profile which define the actions he/she is allowed to perform and the user access capabilities, which define the drawer ID to which the user is authorized to access. Once the user has logged in and the privilege type and user access capabilities defined for the user, the information type #3 is recorded in the chips 12 of every tool 4 stored in the drawers 2 of a respective toolbox 1 to which the user has the right to access and subsequently, the computer 5 sends a signal to the correspondent locking and unlocking means 11 of the specific drawers 2 for unlocking the drawers 2 that the user is authorized to access. Also the computer searches in its database for any tools related to the user ID that need to be returned to the toolbox.

Once the recording of the chips 12 ends, each one of the RFID chip interrogators/scanners 13 of each storage location 3 located in each unlocked drawer 2 begin to interrogate the correspondent tool RFID chip 12 more than one time per second which in the preferred embodiment could be ten times per second, and the Tool ID of each tool 4 is sent to the computer for comparing the list of the Tool ID's detected with a database list of the tool ID's currently assigned to the respective drawers 2 for detecting when a tool 4 is returned to the storage location 3. It should be noted that the RFID chip interrogators/scanners 13 can interrogate the RFID chips 12 more than ten times per second.

Then, the display 6 presents a screen displaying the day, date, name of the user and a list of the tools that the user has already taken and that need to be returned.

When the user opens a drawer 2, the correspondent sensor detects the action and sends a signal to the computer 5, which records this information into a log file.

When the user returns a tool 4 to a storage location 3, the correspondent RFID interrogator/scanner/sensor 13 begins to receive the information of the chip 12 of said tool 4 and when the toolbox's computer 5 compares the list of the tool ID's detected by the interrogators/scanners 13 with the database list of the tools ID's currently assigned to the respective drawers 2, the comparison operation of the tool ID that the user has just returned will succeed and the computer 5 will then acknowledge the returning operation of the specific tool 4. It must be noted that the above process takes only a fraction of a second, thus the returning operation is registered in real time by the computer 5.

The computer 5 further validates that the tool ID of the tool 4 being returned corresponds to one of the tool ID's registered as taken by the specific user. If said validation fails, it means that the specific user is returning a different tool and such event is recorded in the database as explained below.

It must be noted that the above process takes only a fraction of a second. Once the computer 5 acknowledges the returning operation, the operation is recorded in the database by recording the name of the user, user ID, tool ID and the hour and date in which the tool has been returned.

The above referred process is repeated each time the user takes a tool 4 from a storage location 3, and each time the user returns a tool 4 and if the validation process explained above succeeds, the respective tool 4 is deleted from the list of the tools that the user has already taken and that need to be returned showing in the display 6.

If the user tries to place the tool 4 in a wrong storage location 3 (pocket), the validation will fail and the computer will present a message in the display alerting of the error and indicating the right pocket 3 where the tool 4 is supposed to be placed back and will not allow the user to logoff until that error is corrected. If the user tries to return a tool 4 that belongs to other user or/and other toolbox 1 (CTK) the system will not allow the user to do it and will not allow he/she to logoff without taking those tools out. Details of the correct user/CTK are presented in the display 6 as well as the location of the tools placed by mistake in the toolbox 1.

When the user wants to end the returning operation, he/she must close all the drawers 2 and push a button in the computer interface 10 thus indicating that he/she wants to end the returning operation (log out). When the computer 5 receives said instructions it first checks for any open drawer 2 by means of the locking and unlocking means 11 and presents an alert in the display 6 if some of the drawers 2 are not properly closed. When the computer 5 detects that all drawers 2 are closed, it locks all the drawers 2, the screen changes to the welcome screen and the color shade is set to red if it is still at least one tool 4 is missing from the toolbox 1 and presents information about the users owing tools, the number of tools owed by those users and the date/time of the last time those users took tools out of the toolbox, or to the color selected to show that all of the tools have been returned to the toolbox and none of the tools are missing.

But in case a tool is returned by a different user, the computer 5 will register that the user assigned to said tool 4 has not returned the correspondent tool and the problem will be shown by setting the color of the welcome screen to a red shade and presents information about the users owing tools, the number of tools 4 owed by those users and the date/time of the last time those users took tools out of the toolbox. In this screen, any user is allowed to navigate and select any of those users, click a button and see details of tools owed.

Figure 4:
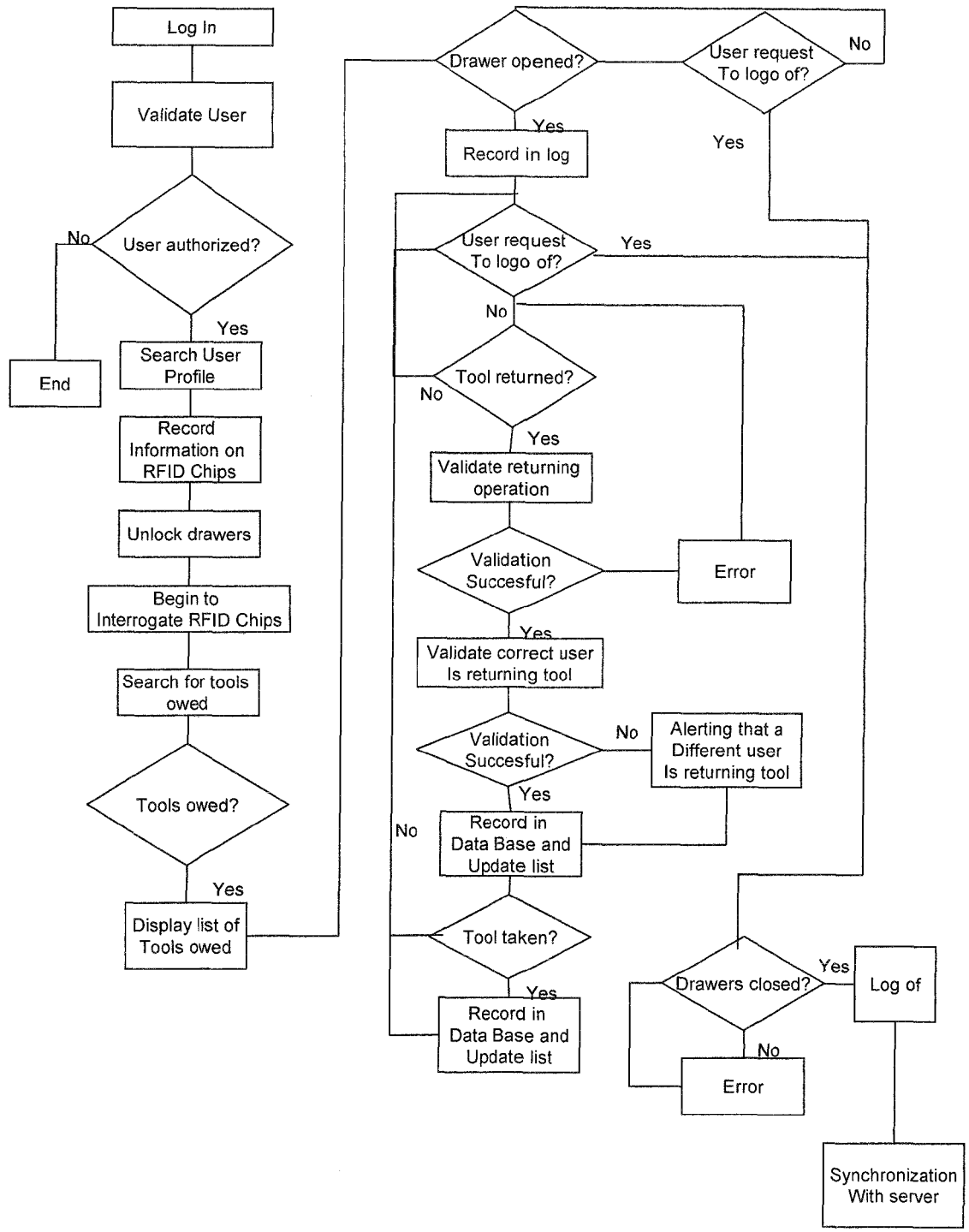
FIG. 4 comprises a flow chart of a preferred modality of a returning operation in accordance with the present invention.
Figure 5:
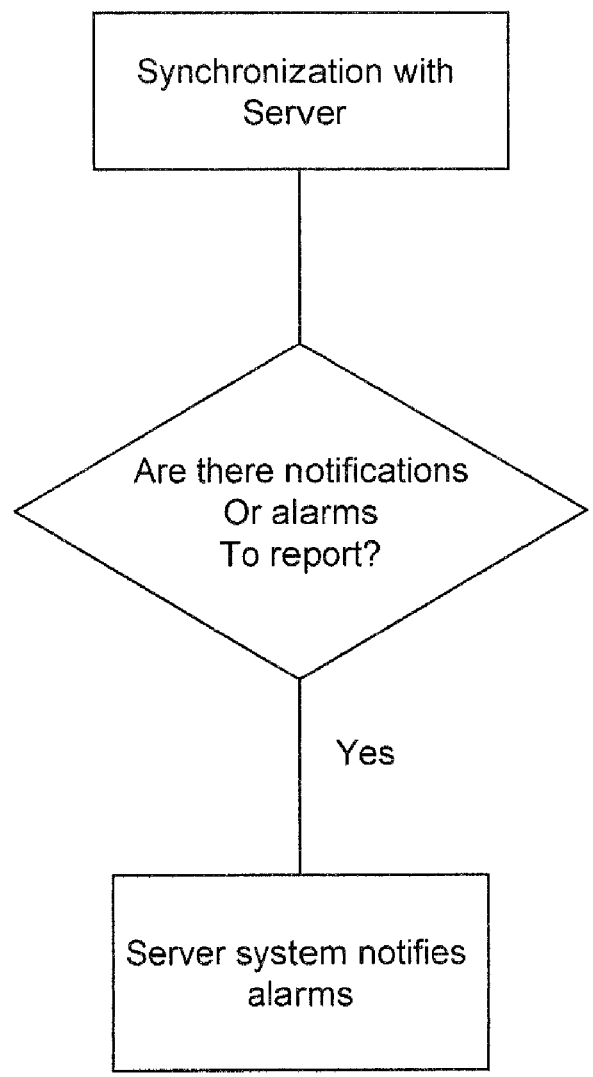
FIG. 5 comprises the continuation of the flow chart of FIG. 4

The flow chart of FIG. 4 shows the above described returning operation. It has to be understood that the order of the steps of the returning operation described above and represented by the flow chart of FIG. 4, may be changed without altering the functionality of the Item tracking system of the present invention.

Managing of Tools Needing Calibration or Unserviceable Tools.

If a user finds that one of the tools 4 that he/she has already taken (or during a taken operation) needs service like calibration, needs maintenance is not working properly, or is unserviceable, the user should change the status of said tool or tools by reporting said tool or tools. First, the user will see in the display 6 the list of tools that were taken out by her/him; then, in order to report a tool 4 that needs service, he/she has to select the tool listed on the screen 6 using the physical interface 10 before returning that tool 4 to the pocket 3 (so it is still visible in the screen) and then, once the tool with problems is highlighted, the user should press a special soft button reading "Need Service" and the tool in the screen will change color and will present an special icon indicating that the selected tool status is marked as needing service and then he/she should return the specific tool to its respective storage location 3 which will erase the tool from the display. The user has to repeat the status change for each one of the tools he/she wants to report as needing service, and to return said tools and log out using the manual interface 10 (pressing a logout soft button). Then the toolbox computer 5 will synchronize the data (which will be explained later) of tools reported as "Need Service" as well as all the activity performed in the toolbox since the last update with the Server System 14 and the server System 14 will send alarms of the tools needing service to the persons and/or emails indicated when configured.

In further taking operations, if a user takes a reported tool as "Need Service", the computer 5 will detect the tool's reported status and will alert the user by means of the display 6 and will not no allow the user to log out taking this tool.

In a preferred embodiment, the toolbox's computer 5 and server system database further includes a "maintenance counter" for specific tools that need a maintenance schedule, which comprises a dynamic record related to said specific tool records representing the number of cycles (i.e. days or times used) that have passed since the last calibration or maintenance and/or a "due maintenance" record, which establishes the number of days in which the tools are scheduled for maintenance and a "details of service required" record which describes the maintenance operations required by the tool. The system will automatically notify by means of an alarm the need of maintenance for specific tools. Said record can be configured whenever a new tool record is added to the toolbox's computer and server system databases. It is possible to configure a tool to receive a maintenance, calibration or service either by number of cycles (i.e. days or times that the tool is used) and/or by number of dates (i.e. every certain amount of days). If the tool is configured just with one option, the system will send the alarm and present the report when the services is due; but if both options are selected, the system will send the alarm on the date of the event that happens first. It is possible to obtain a report of the tools that will need service in the next days where the number of days can be configured by the user. i.e. if a tool is configured to get service every 180 calendar days or every 100 cycles, and the tools is used 100 cycles before the 180 days, then the system will automatically notify that this tool needs service.

A person having a maintenance privilege (maintenance/calibration/repair/service personnel) can log in the computer 5 with such privilege type and obtain reports of tools currently needing service that have been reported by the users, in need of service in accordance with the maintenance counter, reported by other users as "Need Service", or that would need service in the future and details of service required. Said reports would present the list of tools needing service in that tool box 1, the drawer 2, pocket 3 and reason of the service needed (i.e. period of time, number of cycles or reported by a user of the tool 4).

Based on said reports, the maintenance personnel can perform one or more taking operations of such tool or tools and logoff from the toolbox's computer 5. Please note that since the privilege type is maintenance, the computer allows said user to logoff after the taking operations of such tools. During maintenance, the status of such tools change to "in service" and are reported as such in the screen whenever someone obtain an inventory report. It may be noted that whenever one or more tools are out of a toolbox 1 for maintenance, the shade of the welcome screen will be blue (or the color configured by the user to indicate the tool is complete). The toolbox 1 is only considered incomplete if at least one tool is out for any reason different of TDY, out for service or taken out by the administrator for special reason like canceling the tool in that toolbox.

The maintenance personnel can take other tools not listed by the system as needing service and the status of said tools will change indicating that maintenance personnel is taking tools not in need of service for the administrator to accept he/she is taking tools not listed as needing service.

In the Server System 14, the maintenance personnel will see the tools they took or put for Service and he/she will have the privilege to report the type of service provided: Maintenance/Calibration (which will reset the counter for the next maintenance/calibration service) and/or Repair, or Replacement. and finally the maintenance personnel can indicate to the system when every tool is ready for returning to the toolbox 1.

Then the toolbox's computer 5 will perform a synchronization with the Server system 14 if it is configured to communicate in real time, otherwise the user must perform a manual synchronization using a memory media as will be explained later.

With said synchronization operation, the toolbox computer will be expecting the tools that already were served and will change the status as soon as the maintenance personnel return it into the toolbox 1.

Once the tools have been properly serviced, the maintenance personnel are ready to login in the correspondent toolbox's computer 5 and perform the necessary returning operations. After performing the above referred actions the maintenance personnel can logoff of the system.

Managing of Critical Items (Storage Locations with More than One Tool)

A critical Item is a term representing a container 15 having a plurality of tools 16 inside (usually small tools) which do not have an RFID chip individually but having an RFID chip 12 related to the container 16 which is stored in a storage location 3, thus representing said set of tools 16 inside thereof. When the container 15 is raised by the user for taking a tool from a critical Item by a taking operation, it will be displayed on the display 6 the list of all tools from a critical item present in the container 15 to be taken by the user so he/she could verify that said tools 16 are physically complete.

If a piece of a critical item is missing, the user should contact an administrator and notify for the problem.

When a user is returning a critical item by a returning operation, the computer 5 will present in the display 6 the list of items 16 that should be in the container 15 and that are part of the critical item when the user raise the container 15, and will require any other user to pass her/his id card certifying that all pieces 16 of critical items are complete and then, once another user enters his id, the Critical Item and its respective list of components 16 will disappear from the screen 6 in accordance with the above. If the different user does not validate that all of the tools of a critical item are complete then the user returning the tools will have to cancel logout and then find the tools missing or call the administrator to report the loose.

Functionality of the Toolbox's Computer.

As previously described, the toolbox's computer 5 may be used by the users and administrators, which have to login in the computer 5 for performing taking operations, returning operations and report operations.

As previously explained, the toolbox's computer database stores all of the respective toolbox's operations, so that it can provide status reports to any user without the need of login in the computer by using the manual interface.

The following are examples of some of the reports that may be obtained from the toolbox's computer:

Tools report: this report shows an inventory all of the tools that are registered in the respective toolbox's database by showing the following information: Tool description, Tool ID, toolbox ID, drawer ID, storage location ID.

Report of currently taken tools: this report shows all of the tools that have been taken by the users from the respective toolbox 1 by showing the following information: User name, tool description, Tool ID, toolbox ID, drawer ID, storage location ID, date and time of the taken operation.

Report of the last tools that have been returned: this report shows all of the tools that have been recently returned to the respective toolbox 1 by all of the users before any new taking operation is performed by showing the following information: User name, tool description, Tool ID, toolbox ID, drawer ID, storage location ID, date and time of the taken operation.

Report of tools having a TDY (Temporary Duty) status: this report show all of the tools assigned to the respective toolbox 1 having a TDY status as explained above. The report shows the following information: User name, Tool description, Tool ID, toolbox ID, drawer ID, storage location ID, date and time of the change to TDY status (which represent the time and date in which the tool has been taken as a "TDY tool").

Report of unserviceable tools: this report shows all of the tools assigned to the respective toolbox 1 that have been reported as unserviceable by the users by showing the following information: Name of the user who reported, Tool description, Tool ID, toolbox ID, drawer ID, storage location ID, date and time of the report operation.

Report of tools needing calibration: this report shows all of the tools assigned to the respective toolbox 1 that have been reported as in need of calibration by the users. The report shows the following information: Name of the user who reported, Tool description, Tool ID, toolbox ID, drawer ID, storage location ID, date and time of the report operation.

Alarm report of missing tools: this report shows all of the tools that haven't been returned to its respective storage locations 3 in the respective toolbox 1 within a specified time frame. The report shows the following information: Name of the responsible user, Tool description, Tool ID, toolbox ID, drawer ID, storage location ID, time and date of the taken operation, due date.

Alarm report of inconsistencies: this report shows the tools taken by one user and returned by a different user in the respective toolbox 1. The report shows the following information: Name of the user that performed the taking operation, Tool description, Tool ID, toolbox ID, drawer ID, storage location ID, day and date of the taking operation, Name of the user that performed the returning operation, day and date of the returning operation.

Server System Functionality.

The Server System 14 may be used only by a person authorized by a person having an administrator profile, which have to login in the Server System 14.

The Server System 14 stores all of the toolboxes 1 operations in its database, so that it can provide status reports to the administrator users about the use of the entire system.

As previously described the server system 14 can be used by an administrator to add new user and to add or modify user profiles.

The administrator can administer user privileges for accessing the functionality available in the Server System 14 to any user selecting the functionality that each user can access for read only or modify privileges, as well the privileges for the users in the toolboxes computers 5. The administrator can authorize certain users to have certain type of privileges for some toolboxes 1, different privileges in other toolboxes 1 and other privileges in the Server System 14.

When entering a new user for a toolbox 1 in the system (by using the server system 14 after the administrator logs in) the administrator can relate a user with one of the three predetermined user profiles: Administrator, Maintenance personnel or "normal user" of tools, or the administrator can select specific privileges for the specific user. If the selected privileges, match one of the predetermined user profiles, the server system will ask the administrator if he/she wants to relate the user with said predetermined profile or if he/she wants to create said profile.

Also, the server system 14 is able to provide several reports based in the information stored in its database. The following are examples of some of the reports that may be obtained:

Tools report: this report show all of the tools that are registered in the database by showing the following information: Tool description, Tool ID, toolbox ID, drawer ID, storage location ID.

Report of the inventory on hand on every toolbox 1, on every area (predefined toolbox), in the whole company.

Report of currently taken tools: this report shows all of the tools that have been taken by the users by showing the following information: User name, tool description, Tool ID, toolbox ID, drawer ID, storage location ID, date and time of the taken operation.

Report of the last tools that have been returned: this report shows all of the tools that have been recently returned by all of the users before any new taking operation is performed by showing the following information: User name, tool description, Tool ID, toolbox ID, drawer ID, storage location ID, date and time of the taken operation.

Report of tools having a TDY status: this report show all of the tools having a TDY status as explained above. The report shows the following information: User name, Tool description, Tool ID, toolbox ID, drawer ID, storage location ID, date and time of the change to TDY status (which represent the time and date in which the tool has been taken as a "TDY tool").

Report of unserviceable tools: this report shows all of the tools that have been reported as unserviceable by the users by showing the following information: Name of the user who reported, Tool description, Tool ID, toolbox ID, drawer ID, storage location ID, date and time of the report operation.

Report of tools needing calibration: this report shows all of the tools that have been reported as in need of calibration by the users. The report shows the following information: Name of the user who reported, Tool description, Tool ID, toolbox ID, drawer ID, storage location ID, date and time of the report operation.

Alarm report of missing tools: this report shows all of the tools that haven't been returned to its respective storage locations 3 within a specified time frame. The report shows the following information: Name of the responsible user, Tool description, Tool ID, toolbox ID, drawer ID, storage location ID, time and date of the taken operation, due date.

Alarm report of inconsistencies: this report shows the tools taken by one user and returned by a different user. The report shows the following information: Name of the user that performed the taking operation, Tool description, Tool ID, toolbox ID, drawer ID, storage location ID, day and date of the taking operation, Name of the user that performed the returning operation, day and date of the returning operation.

The above referred reports may be sent by e-mail, text message, cell phone message, and or pop up window depending on how the system is configured, to one or more administrators or persons configured by the administrator using a connection to the server system 14, and in the case of the alarm reports, these are always sent to the administrators as soon as an alarm report is received by the server system 14 by means of an information exchange operation as will be explained later.

Interchange of Information Between the Toolbox Computers and the Server System.

It is necessary that the system information stored in the toolboxes computer databases be synchronized with the system information stored in the server system 14. The above may be accomplished by interchanging information by means of Wi-Fi connection (Real time connection), network cabled connection (Real time connection), SD memory cards (manual synchronization), USB memory (manual synchronization) which are well known around the world. All these means of communication are available to the customer and each customer should select and configure his/her preferred means for synchronizing. If the customer selects and configures a Real Time connection, the system will automatically perform a synchronization every time a user login or logout on every toolbox, or every certain amount of time configured by the administrator, what ever happens first. The synchronization is always carried out in both directions (from Server System 14 to the Toolbox's computer 5 and from the Toolbox's computer 5 to the Server System 14) automatically according to a period of time configured.

If the customer selects a manual synchronization, an administrator has to login the toolbox's computer 5, introduce a memory card (not shown) in the computer's memory card reader/writer 8 and select an "Export information" function in the welcome screen by means of the manual interface 10. Once the user confirms the export operation, the computer 5 exports all of the information stored in its database to the memory card, including alarm reports. Once the export operation is finished, the computer 5 will alert the user by means of an alert screen and the user log off from said computer 5. Then the administrator has to take the memory card to the server system 14, login in the server system 14, introduce it to its memory card/reader 17 and select an "Import information" function. Once the user confirms the import operation, the server system 14 imports all of the information stored in the memory card and runs a synchronization program to synchronize the information stored in the memory card with the information stored in its database. Once the synchronization is finished, the server system 14 will alert the user.

In the same way for synchronizing the information stored in the database of a toolbox's computer 5, with current information stored in the server system's database the reverse process should be performed, but by selecting an "import information" option in the welcome screen of the toolbox's computer 5.

The above referred process should be repeated to synchronize the information stored in the database of each toolbox's computer 5 with the information stored in the server system's database.

It is obvious that the information exchange may be made by any other means different from a memory card, such as by a wireless exchange information system or: network cable, wireless network, or manually through and not limited to USB memory or any other removable/portable memory means and the skilled in the art may suggest the use of any other information exchange method.

Tool Usage Statistics.

Based on the usage of each tool based on the information stored in the server system's database, the server system 14 can generate a usage statistic report for each tool or a set of tools, including the usage of the tools by tool, toolbox 1, area, branch, global presenting the tools that should be relocated, the tools with low usage, tools with hi usage, tools with high demand including statistics for tools that where required and not present in the toolbox 1 when needed.

In one embodiment of the invention, in order to inform the system about a tool that was needed and not present in the toolbox 1, the user should use the physical user interface 10 of the computer's toolbox 5 in order to obtain a list of tools not present for the drawer currently open and then select the tool that she/he was needing.

Finally it must be understood that the item tracking system of the present invention, is not limited exclusively to the embodiments above described and illustrated and that the persons having ordinary skill in the art can, with the teaching provided by the invention, to make modifications to the item tracking system of the present invention, which will clearly be within of the true inventive concept and of the scope of the invention which is claimed in the following claims.

What is claimed is:

1. An item tracking system for using in a working area having one or a plurality of storage boxes each having a plurality of drawers each including a plurality of item storage locations, each item storage location comprising an individually shaped recess for receiving a specific item which can be taken or returned, wherein the shape of the recess matches to the shape of the item, wherein the items can be taken and returned to a storage location by means of a taking and returning operation, said item tracking system comprising:

a plurality of user identification means;
    a plurality of storage boxes, each having:
        a computer, including a database, information displaying means and a user identification reader means for reading the user identification means and a user interface;
        automatic locking and unlocking means for each drawer controlled by the computer each including a sensor for detecting when the drawer is opened or closed;
        a plurality of readable/writable RFID chips, each permanently joined to a respective item and having item information;
        a plurality of RFID chip interrogators/scanners, each assigned to a respective storage location of a respective drawer of a respective storage box for specifically interrogating/scanning a respective RFID chip of one item, each interrogator/scanner connected to the computer;
        a plurality of RFID chip recorders each assigned to a respective storage location of a respective drawer of a respective storage box for specifically recording a respective RFID chip of one item with item information and time and date information;
    a server system connected to a computer network having a database;
    wherein the computer of each storage box and the server system are capable of controlling the following operations:
    item taking operations;
    item returning operations;
    control of items maintenance;
    control of multiple items stored in one specific container;

control of item usage;
wherein each computer of each storage box is capable of interchanging information with the server system and vice versa for the synchronizing of information between them;
wherein the computer of each storage box and the server system are capable of providing reports including information about the items controlled by the system and information about system operations; and
wherein the system is capable to send alarms and reports to the users.

2. An item tracking system as claimed in claim 1, wherein the each of the user identification means have personalized identification information recorded comprising: user name, user ID and user profiles selected from the group comprising normal user, administrator and maintenance.

3. An item tracking system as claimed in claim 1, wherein the computer and the server system each including a memory card reader/writer for synchronizing information by means of memory cards.

4. An item tracking system as claimed in claim 1, wherein the database of each storage box's computer contains the following information:
  users authorized to access each item box, drawers accessible to each user in each item box and privilege type which is selected from the group comprising: user of items, administrator and maintenance person;
  items assigned to the respective storage box represented by the following data: Item description, Item ID, storage box ID, drawer ID, storage location ID;
  items taken from the respective storage box, represented by the following data: user name, privilege type, item description, Item ID, storage box ID, drawer ID, storage location ID, date and time of the taking operation;
  items returned to a respective storage box before any new taking operation is performed represented by the following data: User name, privilege type, item description, Item ID, storage box ID, drawer ID, storage location ID, date and time of the returning operation;
  item's status, user who changed status, privilege type, Item description, Item ID, storage box ID, drawer ID, storage location ID, status, date and time of the change of status operation.

5. An item tracking system as claimed in claim 1, wherein each RFID chip having the following memory types:
  memory type #1: including information that is permanently recorded in the chip comprising: item ID, item description and serial number;
  memory type #2: including information that can only be modified by an authorized person which is assigned by an administrator, comprising: ID of the company that owns the item, company branch ID and storage box ID; and
  memory type #3 including information that is updated every time an user logs in to the system and said RFID chip corresponds to a item stored in the storage area of a drawer that said user is authorized to access, said information comprising the user ID and current time and date.

6. An item tracking system as claimed in claim 1, wherein each RFID chip having the following memory types:
  memory type #1: including information that is permanently recorded in the chip comprising: item ID, item description and serial number;
  memory type #2: including information that can only be modified by an authorized person which is assigned by an administrator, comprising: ID of the company that owns the item, company branch ID and storage box ID; storage box drawer ID and storage location ID to which the item and storage box are assigned; and
  memory type #3 including information that is updated every time an user logs in to the system and said RFID chip corresponds to a item stored in the storage area of a drawer that said user is authorized to access, said information comprising the user ID and current time and date.

7. An item tracking system as claimed in claim 1, wherein each RFID chip having the following memory types:
  memory type #1: including information that is permanently recorded in the chip comprising: item ID, item description and serial number;
  memory type #2: including information that can only be modified by an authorized person which is assigned by an administrator, comprising: ID of the company that owns the item, company branch ID and storage box ID; storage box drawer ID and storage location ID to which the item and storage box are assigned;
  memory type #3 including information that is updated every time an user logs in to the system and said RFID chip corresponds to a item stored in the storage area of a drawer that said user is authorized to access, said information comprising the user ID and current time and date; and
  further including a item log, including information about the user ID of the last users of the item and the time and date in which a item was taken and returned.

8. An item tracking system as claimed in claim 1, wherein each RFID chip interrogator/scanner interrogates each RFID chip at least one time per second.

9. An item tracking system as claimed in claim 1, wherein each RFID chip having the following memory types:
  memory type #1: including information that is permanently recorded in the chip comprising: item ID, item description and serial number;
  memory type #2: including information that can only be modified by an authorized person which is assigned by an administrator, comprising: ID of the company that owns the item, company branch ID and storage box ID; storage box drawer ID and storage location ID to which the item and storage box are assigned;
  memory type #3 including information that is updated every time an user logs in to the system and said RFID chip corresponds to a item stored in the storage area of a drawer that said user is authorized to access, said information comprising the user ID and current time and date;
  further including a item log, including information about the user ID of the last users of the item and the time and date in which a item was taken and returned; and
  wherein each RFID chip recorder recording a respective RFID chip of one item with the memory type 1, 2, and 3 information including: user ID, time and date of the taken operation, and for updating the item log.

10. An item tracking system as claimed in claim 1, wherein the server system database including the following information:
  items assigned to each storage box;
  items taken from each storage box;
  items returned to each storage box before any new taking operation is performed; and
  item's status.

11. An item tracking system as claimed in claim 1, wherein the server system database including the following information:

information about items assigned to each storage box comprising: Item description, Item ID, storage box ID, and optionally drawer ID, and storage location ID;

information about items taken from each storage box comprising: User name, item description, Item ID, storage box ID, drawer ID, storage location ID, date and time of the taken operation;

information about item items returned to each storage box before any new taking operation is performed comprising: User name, item description, Item ID, storage box ID, drawer ID, storage location ID, date and time of the taken operation; and item's status comprising: alarm status; user who changed status, Item description, Item ID, storage box ID, drawer ID, storage location ID, status, date and time of the change of status operation.

12. An item tracking system as claimed in claim 1, wherein each user can be related with the following profiles:

a normal user profile which allows a person to take and return items from one or more storage boxes and to enter reports in the system as will be explained later;

an administrator profile which allows a person to: take and return items, from one or more storage boxes, configure privileges for other users, configure user access capabilities which indicates the system which drawers of a storage box a user is authorized to access, to authorize certain user operations such as to change the status of an item to a TDY status and to modify the information of the databases of server system and of each one of the storage box's computers;

a maintenance profile which allows a person to take and return items having a status comprising: needing calibration or unserviceable, and to enter into the system reports related to the type of work performed to the items like repair, maintenance or calibration, replaced;

and wherein each profile by a person having an administrator profile.

13. An item tracking system as claimed in claim 1, in which each storage box's computer including an external RFID chip reader and wherein the system having an standby mode during which all drawers remain closed and locked, and each RFID chip interrogator/scanner located on every storage location of each drawer corresponding to every item is inactive, and wherein the information of a RFID chip of any item can be read by means of the external RFID reader and displayed by the storage box's computer displaying means.

14. An item tracking system for using in a working area having one or a plurality of storage boxes each having a plurality of drawers each including a plurality of item storage locations, each item storage location comprising an individually shaped recess for receiving a specific item which can be taken or returned, wherein the shape of the recess matches to the shape of the item, wherein the items can be taken and returned to a storage location by means of a taking and returning operation, the item tracking system comprising:

a plurality of user identification means;

a plurality of storage boxes, each having:

a computer, including a database, and user identification reader means for reading the user identification means;

a plurality of electronic identification means, each joined to a respective item and having item information;

a plurality of electronic identification means interrogators/scanners, each assigned to a respective storage location of a respective drawer of a respective storage box for specifically interrogating/scanning a respective electronic identification means of one item, each interrogator/scanner connected to the computer.

15. An item tracking system as claimed in claim 14, further including a plurality of recorders each assigned to a respective storage location of a respective drawer of a respective storage box for specifically recording a respective electronic identification means of one item with item information and time and date information.

16. An item tracking system as claimed in claim 14, further including an external computer system having a database and connected to a computer network, wherein each computer of each storage box is capable of interchanging information with the external computer system and vice versa for the synchronizing of information between them.

17. An item tracking system as claimed in claim 16, further including an external computer system having a database and connected to a computer network, and wherein the computer of each storage box and the server system are capable of providing reports including information about the items controlled by the system and information about system operations.

18. An item tracking system as claimed in claim 16, wherein the computer and the server system each including a memory card reader/writer for synchronizing information by means of memory cards.

19. An item tracking system as claimed in claim 16, wherein the interchange of information for the synchronization of information between the external computer system's database and the database of each of each computer of each storage box is carried out by means of one or more of the following means: Wi-Fi connection, network cabled connection or USB memory for a manual synchronization.

20. An item tracking system as claimed in claim 17, further including an external computer system having a database and connected to a computer network, wherein the computer of each storage box and the server system are capable of controlling the following operations:

item taking operations;

item returning operations;

control of items maintenance;

control of multiple items stored in one specific container; and control of item usage.

21. An item tracking system as claimed in claim 20, wherein the returning operation in one or more storage box's comprising:

a) the storage box's computer validating that the identification information of a user identification means read by the storage box's computer user identification reader means is present in the database thereof thus authorizing a user to access a correspondent storage box;

b) the storage box's computer searching in the database for information about the drawers a correspondent user is authorized to access once the step a) is completed;

c) the storage box's computer recording in the electronic identification means of every item stored in the drawers of a respective storage box to which the user is authorized to access with user information and current day and date by means of the plurality of electronic identification means recorders once the step b) is completed;

d) the storage box's computer sending a signal to the locking and unlocking means of each drawer to which the user is authorized to access in order to unlock said drawers and once the step c) is completed;

e) the storage box's computer activating the plurality of electronic identification means interrogators/scanners of each storage location of the drawers of a respective storage box to which the user is authorized to access once the step d) is completed;

f) the storage box's computer searching in its database for any item owed by a correspondent user and showing said information by means of displaying means once the previous steps are completed;

g) the storage box's computer detecting when any of the unlocked drawers is opened by means of the sensor for detecting when the drawer is opened or closed and recording this information in a log file in its database;

h) the storage box's computer detecting when a item is returned to a storage location by interrogating correspondent item electronic identification means and comparing the obtained items information with a database list of the items currently assigned to the respective drawers and detecting when a item is returned to a storage location when said comparison succeed;

i) the storage box's computer validating that the item is being returned to the correct storage location and showing a message error by means of display means and not allowing the user to exit the system until the user returns the item to its correspondent storage location;

j) the storage box's computer validating that the item being returned corresponds to one of the items registered as taken by the user performing the returning operation, and if said validation fails, it means that the specific user is returning a different tool and such even is recorded in the database;

k) the storage box's computer recording in its database user information, item information and the hour and date in which the item has been returned and deleting the information from the display means of the items that have been returned;

l) the steps h),i), j) and k) are repeated for each item returned;

m) the storage box's computer acknowledging an order of the user to exit the operation and validating that all of the drawers are closed by means of the correspondent sensors and showing an error message by means of a display if one or more drawers are not closed thus not allowing the user to exit the system;

n) the storage box's computer allowing the user to exit the system once the step m) has been completed; and o) the storage box's computer interchanging information with the server system in order to synchronize its database information with the server system database once the previous steps have been completed.

22. An item tracking system as claimed in claim 20, wherein the control of item maintenance is carried out during taking or returning operations in one or more storage boxes by:

a) the storage box's computer receiving a request for change of status of an item by an user that has already taken an item and that has previously accessed the system, said change of status selected from the group of calibration, need maintenance or unserviceable;

b) the storage box's computer changing the status of said item and registering said status change in its database c) the steps a) and b) are repeated for each item the user request a change of status;

d) the storage box's computer interchanging information with the server system in order to synchronize its database information with the external computer system database once the previous steps have been completed; and wherein the tools that have a status of calibration, need maintenance or unserviceable are not allowed to be taken by other users.

23. An item tracking system as claimed in claim 20, wherein the control of item maintenance is carried out automatically by each storage box's computer and the external computer system by means of "maintenance counters" for specific items which comprises a dynamic record related to specific item records stored in the storage box's computer and external computer system representing the number of cycles that have passed since the last maintenance operation and a "due maintenance" record, which establishes the number of cycles in which said items are schedule for maintenance and a "details of service required" record which describes the maintenance operations required by the item, wherein the system will automatically notify by means of an alarm the need of maintenance for specific tools when the maintenance counter matches the "due maintenance record", wherein after the maintenance operation is completed, said counter is reset and wherein the storage box's computer does not allow that an item due for maintenance to be taken by any user except an administrator.

24. An item tracking system as claimed in claim 20, wherein the control of item maintenance is carried out automatically by each storage box's computer and the external computer system by means of "maintenance counters" for specific items which comprises a dynamic record related to specific item records stored in the storage box's computer and external computer system representing the number of days passed since the last maintenance operation and a "due maintenance" record, which establishes the number of cycles in which said items are schedule for maintenance and a "details of service required" record which describes the maintenance operations required by the tool; wherein the system will automatically notify by means of an alarm the need of maintenance for specific tools when the maintenance counter matches the "due maintenance record"; wherein after the maintenance operation is completed, said counter is reset; and wherein the storage box's computer does not allow that an item due for maintenance to be taken by any user except an administrator.

25. An item tracking system as claimed in claim 20, wherein an user having an administrator privilege can access a storage box's computer, obtain a report of items needing service and perform one or more maintenance taking operations of such items and report to the computer the type of service provided and the date in which the item or items will be returned to the correspondent storage locations, and wherein after said one or more maintenance taking operations, the status of said item or item's automatically change to "in service".

26. An item tracking system as claimed in claim 20, wherein an user having an administrator privilege can access a storage box's computer, obtain a report of items needing service and perform one or more maintenance taking operations of such items and report to the computer the type of service provided and the date in which the item or items will be returned to the correspondent storage locations; wherein after said one or more maintenance taking operations, the status of said item or item's automatically change to "in service" and wherein a user having an administrator privilege can access a storage box's computer and perform one or more item returning operations of said item or items when the maintenance has been carried out and wherein the computer will change the status of "in service" for said item or items.

27. An item tracking system as claimed in claim 20, wherein a container having multiple items can be stored in a storage location and has only one electronic identification means representing said multiple items inside the container and wherein the control of multiple items stored in one specific container is carried out during taking and returning operations by:

the storage box's computer detecting when the container is taken from the storage location;

the storage box's computer displaying the list of all items that are assigned to the container and available to be taken by an user or that have to be returned;

registering the taken operation from the container; and wherein the user performs a returning operation of said item or items to the container, the storage box's computer detects when the container is taken from the storage location, displays a list of all items that are assigned to the container and does not allow the user to end the returning operation until another user verify that the items of the container are complete and provides the identification means to the storage box's computer.

28. An item tracking system as claimed in claim 20, wherein a user having an administrator profile can access the external computer system in order to add new users and to add or modify user profiles.

29. An item tracking system as claimed in claim 20, wherein the external computer system provides the following reports:

an items report providing information about all of the items that are registered in the external computer system's database;

report of inventory on hand on every storage box;

report of currently taken items: including information about the items that have been taken by the users;

report of returned items: including information about all of the items that have been recently returned by all users before any new taking operation is performed;

report of items taken by more than one day: including information about the items that have been taken by more than one day;

report of unserviceable items: including information about the items that have been reported as unserviceable by the users;

report of items needing maintenance: including information about the items that have been reported needing maintenance by the users;

report of missing items: including information about the items that haven't been returned to its respective storage locations within a specified time frame; and report of inconsistencies: including information about items taken by one user and returned by a different user.

30. An item tracking system as claimed in claim 20, wherein the external computer system can send the reports and alarms to the users by the following means: e-mail, text message, cell phone or text message.

31. An item tracking system as claimed in claim 20, wherein the computer of each storage box and the external computer system each including a memory card writer and reader and wherein each of the computers of each storage box record the information stored in their database in a memory card by means of the memory card writer and reader so that it can be read by the memory card reader of the external computer system and the information recorded in each memory card can be synchronized with the information stored in the external computer system's database.

32. An item tracking system as claimed in claim 20, wherein the computer of each storage box and the external computer system each including a memory card writer and reader and wherein the external computer system records the information stored in its database in a memory card by means of the memory card writer and reader so that it can be read by the memory card readers of each computer of each storage box, and the information recorded in the memory card can be synchronized with the information stored in the database of each computer of each storage box.

33. An item tracking system as claimed in claim 20, wherein the control of item usage is carried out by the external computer system by generating usage statistic report for each item, including the usage of each item by storage box, area, and company branch, global showing the items that should be relocated from storage location, items with low usage, items with usage, items with high demand including statistics for items that where required and not present in the storage box when needed, said usage statistics based on the information stored in the server system's database about the usage of each tool.

34. An item tracking system as claimed in claim 20, wherein the server system database including the following information:

items assigned to each storage box;

items taken from each storage box;

items returned to each storage box before any new taking operation is performed; and items' status.

35. An item tracking system as claimed in claim 20, wherein the server system database including the following information:

information about items assigned to each storage box comprising: Item description, Item ID, storage box ID, and optionally drawer ID, and storage location ID;

information about items taken from each storage box comprising: User name, item description, Item ID, storage box ID, drawer ID, storage location ID, date and time of the taken operation;

information about items returned to each storage box before any new taking operation is performed comprising: User name, item description, Item ID, storage box ID, drawer ID, storage location ID, date and time of the taken operation; and item's status comprising: alarm status; user who changed status, Item description, Item ID, storage box ID, drawer ID, storage location ID, status, date and time of the change of status operation.

36. An item tracking system as claimed in claim 20, wherein the taking operation comprising:

a) the storage box's computer validating that the identification information of a user identification means read by the storage box's computer user identification reader means is present in the database thereof thus authorizing a user to access a correspondent storage box;

b) the storage box's computer searching in the database for information about the drawers a correspondent user is authorized to access once the step a) is completed;

c) the storage box's computer recording in the electronic identification means of every item stored in the drawers of a respective storage box to which the user is authorized to access with user information and current day and date by means of the plurality of electronic identification means recorders once the step b) is completed;

d) the storage box's computer sending a signal to the locking and unlocking means of each drawer to which the user is authorized to access in order to unlock said drawers and once the step c) is completed;

e) the storage box's computer activating the plurality of electronic identification means interrogators/scanners of each storage location of the drawers of a respective storage box to which the user is authorized to access once the step d) is completed;

f) the storage box's computer searching in its database for any item owed by a correspondent user and showing said information by means of displaying means once the previous steps are completed;

g) the storage box's computer detecting when any of the unlocked drawers is opened by means of the sensor for detecting when the drawer is opened or closed and recording information about this action in a log file in its database;

h) the storage box's computer detecting when a item is retired from the storage location by interrogating correspondent item electronic identification means and comparing the obtained items information with a database list of the items currently assigned to the respective drawers and detecting when a item is retired from the storage location when said comparison fails;

i) the storage box's computer recording in its database user information, item information and the hour and date in which the item has been taken and showing information about the items taken by means of display means;

j) the steps h) and i) are repeated for each item taken;

k) the storage box's computer acknowledging an order of the user to exit the operation and validating that all of the drawers are closed by means of the correspondent sensors and showing an error message by means of a display if one or more drawers are not closed thus not allowing the user to exit the system;

l) the storage box's computer allowing the user to exit the system once the step k) has been completed; and m) the storage box's computer interchanging information with the server system in order to synchronize its database information with the server system database once the previous steps have been completed.

37. An item tracking system as claimed in claim 36, wherein an user can enter a report about one or more items that were required by the user but not found in the storage box.

38. An item tracking system as claimed in claim 36, wherein the user can return an item if the user has taken said item in error and wherein the storage box's computer will register said operation and will erase the item from the display means.

39. An item tracking system as claimed in claim 36, wherein the storage box's computer further validating if the status of each taken item allows the user to take said tool or tools, and not allowing the user to exit the system if the status of one or more tools do not authorize a user to take said one or more tools until the user replace said tool or tools to the respective storage locations.

40. An item tracking system as claimed in claim 36, wherein the system automatically changes the status of an item to "item lost" if said item is not returned within 24 hours from the time in which it was taken and wherein a control of items taken for more than one day is carried out during the taken operation by registering a petition from the user related to a specific item to change the status of said item to "taken for more than one day" with the authorization of a user having an administrator privilege, and prevent that the system automatically change the status of the item to "item lost".

41. An item tracking system as claimed in claim 14, wherein the item tracking system is capable to send alarms and reports to the users.

42. An item tracking system as claimed in claim 14, further including automatic locking and unlocking means for each drawer controlled by the storage box computer each including a sensor for detecting when the drawer is opened or closed.

43. An item tracking system as claimed in claim 14, wherein the each of the user identification means have personalized identification information recorded comprising: user name, user ID and user profiles selected from the group comprising normal user, administrator and maintenance.

44. An item tracking system as claimed in claim 14, wherein the database of each storage box's computer contains the following information:

users authorized to access each item box, drawers accessible to each user in each item box and privilege type which is selected from the group comprising: user of items, administrator and maintenance person;

items assigned to the respective storage box represented by the following data: Item description, Item ID, storage box ID, drawer ID, storage location ID;

items taken from the respective storage box, represented by the following data: user name, privilege type, item description, Item ID, storage box ID, drawer ID, storage location ID, date and time of the taking operation;

items returned to a respective storage box before any new taking operation is performed represented by the following data: User name, privilege type, item description, Item ID, storage box ID, drawer ID, storage location ID, date and time of the returning operation; and item's status, user who changed status, privilege type, Item description, Item ID, storage box ID, drawer ID, storage location ID, status, date and time of the change of status operation.

45. An item tracking system as claimed in claim 14, wherein each electronic identification means having the following memory types:

memory type #1: including information that is permanently recorded in the chip comprising: item ID, item description and serial number;

memory type #2: including information that can only be modified by an authorized person which is assigned by an administrator, comprising: ID of the company that owns the item, company branch ID and storage box ID; and memory type #3 including information that is updated every time an user logs in to the system and said electronic identification means corresponds to an item stored in the storage area of a drawer that said user is authorized to access, said information comprising the user ID and current time and date.

46. An item tracking system as claimed in claim 14, wherein each electronic identification means having the following memory types:

memory type #1: including information that is permanently recorded in the chip comprising: item ID, item description and serial number;

memory type #2: including information that can only be modified by an authorized person which is assigned by an administrator, comprising: ID of the company that owns the item, company branch ID and storage box ID; storage box drawer ID and storage location ID to which the item and storage box are assigned; and memory type #3 including information that is updated every time a user logs in to the system and said electronic identification means corresponds to an item stored in the storage area of a drawer that said user is authorized to access, said information comprising the user ID and current time and date.

47. An item tracking system as claimed in claim 14, wherein each electronic identification means having the following memory types:
- memory type #1: including information that is permanently recorded in the chip comprising: item ID, item description and serial number;
- memory type #2: including information that can only be modified by an authorized person which is assigned by an administrator, comprising: ID of the company that owns the item, company branch ID and storage box ID; storage box drawer ID and storage location ID to which the item and storage box are assigned;
- memory type #3 including information that is updated every time a user logs in to the system and said electronic identification means corresponds to an item stored in the storage area of a drawer that said user is authorized to access, said information comprising the user ID and current time and date; and
- further including a item log, including information about the user ID of the last users of the item and the time and date in which an item was taken and returned.

48. An item tracking system as claimed in claim 14, wherein each electronic identification means interrogator/scanner interrogates each electronic identification means at least one time per second.

49. An item tracking system as claimed in claim 14, wherein each electronic identification means having the following memory types:
- memory type #1: including information that is permanently recorded in the chip comprising: item ID, item description and serial number;
- memory type #2: including information that can only be modified by an authorized person which is assigned by an administrator, comprising: ID of the company that owns the item, company branch ID and storage box ID; storage box drawer ID and storage location ID to which the item and storage box are assigned;
- memory type #3 including information that is updated every time a user logs in to the system and said electronic identification means corresponds to an item stored in the storage area of a drawer that said user is authorized to access, said information comprising the user ID and current time and date;
- further including a item log, including information about the user ID of the last users of the item and the time and date in which an item was taken and returned; and
- wherein each electronic identification means recorder recording a respective electronic identification means of one item with the memory type 1, 2, and 3 information including: user ID, time and date of the taken operation, and for updating the item log.

50. An item tracking system as claimed in claim 14, wherein each user can be related with the following profiles:
- a normal user profile which allows a person to take and return items from one or more storage boxes and to enter reports in the system as will be explained later;
- an administrator profile which allows a person to: take and return items, from one or more storage boxes, configure privileges for other users, configure user access capabilities which indicates the system which drawers of a storage box a user is authorized to access, to authorize certain user operations such as to change the status of an item to a TDY status and to modify the information of the databases of server system and of each one of the storage box's computers;
- a maintenance profile which allows a person to take and return items having a status comprising: needing calibration or unserviceable, and to enter into the system reports related to the type of work performed to the items like repair, maintenance or calibration, replaced;
- and wherein each profile by a person having an administrator profile.

51. An item tracking system as claimed in claim 14, in which each storage box's computer including an external electronic identification means reader and wherein the system having a standby mode during which all drawers remain closed and locked, and each electronic identification means interrogator/scanner located on every storage location of each drawer corresponding to every item is inactive, and wherein the information of a electronic identification means of any item can be read by means of the external electronic identification means reader and displayed by the storage box's computer displaying means.

52. An item tracking system as claimed in claim 14, wherein:
- the computer of each storage box comprises displaying means of each storage box's comprises a display; and
- wherein the system having a standby mode in which the display of each storage box shows a color configurable by an administrator indicating that no items are missing from a storage box, except the items that have been taken for maintenance or the items that have been taken for more than one day.

53. An item tracking system as claimed in claim 14, wherein each storage box's computer provides the following reports:
- an items report: comprising an inventory of all the items that are registered in the respective storage box's computer database;
- a report of currently taken items: including information about the items that have been taken by the users from a respective storage box;
- a report of the last items that have been returned: including information about the items that have been recently returned to a respective storage box by all of the users before any new taking operation is performed;
- a report of items that have been taken by more than one day: including information about the items assigned to a respective storage box that have been taken by more than one day;
- a report of unserviceable items: including information about the items assigned to a respective toolbox that have been reported as unserviceable by the users;
- a report of items needing maintenance: including information about the items assigned to a respective storage box that have been reported as needing maintenance by the users;
- report of missing tools: including information about the items that haven't been returned to its respective storage locations in the respective storage box within a specified time frame; and
- report of inconsistencies: including information about the items taken by one user and returned by a different user in a respective storage box.

* * * * *